US012566658B1

(12) United States Patent
Resnianski et al.

(10) Patent No.: US 12,566,658 B1
(45) Date of Patent: Mar. 3, 2026

(54) SYSTEM AND METHOD FOR ROOT CAUSE ANALYSIS USING TREE STRUCTURE ANALYSIS

(71) Applicant: Wiz, Inc., New York, NY (US)

(72) Inventors: Pavel Resnianski, Tel Aviv (IL); Amit Tal, Ramat Gan (IL); Bernie Pinkenzon-Howard, Tel Aviv (IL); Barak Bercovitz, Even-Yehuda (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/057,067

(22) Filed: Feb. 19, 2025

(51) Int. Cl.
G06F 11/00 (2006.01)
G06F 11/07 (2006.01)
G06F 16/22 (2019.01)

(52) U.S. Cl.
CPC ........ *G06F 11/079* (2013.01); *G06F 11/0736* (2013.01); *G06F 16/2272* (2019.01)

(58) Field of Classification Search
CPC .............. G06F 11/079; G06F 11/0793; G06F 11/0703; G06F 11/0766
See application file for complete search history.

(56) References Cited

U.S. PATENT DOCUMENTS

| | | | | | |
|---|---|---|---|---|---|
| 7,792,770 | B1 * | 9/2010 | Phoha | .................... | G06N 20/00 706/45 |
| 10,061,637 | B1 * | 8/2018 | Halbersberg | .......... | G06F 11/079 |
| 10,063,570 | B2 * | 8/2018 | Muddu | ................. | G06F 16/285 |
| 10,768,868 | B2 * | 9/2020 | Ota | .................... | G06F 11/0787 |
| 12,130,720 | B2 * | 10/2024 | Mandal | .................... | G06N 5/01 |
| 12,242,332 | B2 * | 3/2025 | Ashrafi | ................. | G06F 11/079 |
| 2009/0113248 | A1 * | 4/2009 | Bock | .................... | G06F 11/0748 714/39 |
| 2016/0036844 | A1 * | 2/2016 | Kopp | .................... | G06N 5/045 726/1 |
| 2017/0083920 | A1 * | 3/2017 | Zoldi | .................... | G06N 20/00 |

(Continued)

OTHER PUBLICATIONS

"On the maximum common embedded subtree problem for ordered trees," String Algorithmics (2004): 155-170 (available at https://pdfs.semanticscholar.org/0b6e/061af02353f7d9b887f9a378be70be64d165.pdf) (last accessed Nov. 4, 2024, at 5:45 PM Eastern Time).

(Continued)

*Primary Examiner* — Jonathan D Gibson
(74) *Attorney, Agent, or Firm* — M&B IP Analysts, LLC

(57) ABSTRACT

A system and method for root cause analysis. A method includes defining tree structures based on metadata of interconnected systems. Each tree structure represents at least a portion of one of the interconnected systems and includes subtrees. Tree structure pairs are identified based on the tree structures. Each tree structure pair includes first and second tree structures. Graph data structures are generated based on the tree structures. Each graph data structure corresponds to one of the tree structures and includes nodes. Each node of each graph data structure represents a respective subtree of the corresponding tree structure. A comparison is performed between graph data structures, where a first graph data structure representing the first tree structure of each tree structure pair is compared to a second graph data structure representing the second tree structure of the tree structure pair in the comparison. Tree structures are matched based on the comparison.

15 Claims, 7 Drawing Sheets

100

(56) References Cited

U.S. PATENT DOCUMENTS

| | | | | |
|---|---|---|---|---|
| 2019/0050279 A1* | 2/2019 | Derr | .................... | G06F 11/0709 |
| 2019/0278647 A1* | 9/2019 | Bakucz | ............... | G06F 11/2257 |
| 2019/0324836 A1* | 10/2019 | Fleischman | ........... | G06F 21/552 |
| 2020/0012551 A1* | 1/2020 | Liang | .................. | G06F 16/2455 |
| 2022/0222238 A1* | 7/2022 | Herrema, III | ....... | G06F 16/2365 |
| 2023/0050889 A1* | 2/2023 | Kumar Jaya Kumar | .................... | |
| | | | | G06F 16/9027 |
| 2023/0105304 A1* | 4/2023 | Mandal | ............... | G06F 18/2415 |
| | | | | 714/37 |
| 2023/0353447 A1* | 11/2023 | Vaderna | .............. | H04L 41/0631 |

OTHER PUBLICATIONS

Github, "The network_algo_common_subtree Module," Author username: Erotemic (available at https://github.com/Erotemic/networkx_algo_common_subtree/tree/669889b4a4dcd8864f27c494863c5d4d4f48ace0?tab=readme-ov-file#the-networkx_algo_common_subtree-module) (last accessed Oct. 14, 2024, at 3:48 PM EST).

* cited by examiner

100

Comparison Server 160

Database 150

Cybersecurity Tools 140

Network

110

User Device 120

Root Cause Analyzer 130

S250

Start

S610

Identify tree structures to be compared

S620

Determine normalized representations of subtrees

S630

Transform tree structures into graph data structures

S640

Generate embeddings

S650

Determine similarities between tree structures

S660

Generate lists organized based on degrees of similarity

End

SYSTEM AND METHOD FOR ROOT CAUSE ANALYSIS USING TREE STRUCTURE ANALYSIS

TECHNICAL FIELD

The present disclosure relates generally to root cause analysis, and more specifically to root cause analysis based on hierarchies represented via tree structures.

BACKGROUND

With the ever-evolving digital transformation businesses, the software development lifecycle has become a notable component of many successful businesses. While the increased amount of software being utilized promises great improvements in how services are delivered, software development remains a persistent challenge. In particular, due to development velocity rapidly increasing, software is being created and deployed faster than ever, and software infrastructure must often be expanded rapidly to accommodate. As more software is created, ways to identify and address problems resulting from software development issues and, more specifically, automated tools to aid in mitigating cyber threats, are becoming increasingly desirable.

Additionally, due to the large amount of software being created and the significant investments in delivery automation powered by DevOps, complex continuous integration/continuous delivery (CI/CD) pipelines that use on-premises or cloud-native technologies to build, deploy, and control the entire application stack have been adopted. These pipelines can control everything from infrastructure to business logic, and the interactions between resources in the software environment can no longer be effectively managed manually by human operators alone. As a result of these issues, security teams in companies are seeing increased business risk and employee burnout. Further, companies face challenges in effectively mitigating risks once security vulnerabilities have been introduced via newly created flawed software.

Solutions for improving or otherwise enabling new forms of root cause analysis are therefore desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for root cause analysis. The method comprises: defining a plurality of tree structures based on metadata of a plurality of interconnected systems, wherein each tree structure represents at least a portion of one of the plurality of interconnected systems, wherein each tree structure includes a plurality of subtrees; identifying a plurality of tree structure pairs based on the plurality of tree structures, wherein each tree structure pair includes a first tree structure and a second tree structure; generating a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure; comparing between graph data structures among the plurality of graph data structures, wherein a first graph data structure representing the first tree structure of each tree structure pair is compared to a second graph data structure representing the second tree structure of the tree structure pair; and matching between tree structures of the plurality of tree structures based on the comparison.

Certain embodiments disclosed herein also include a non-transitory computer-readable medium having stored thereon causing a processing circuitry to execute a process, the process comprising: defining a plurality of tree structures based on metadata of a plurality of interconnected systems, wherein each tree structure represents at least a portion of one of the plurality of interconnected systems, wherein each tree structure includes a plurality of subtrees; identifying a plurality of tree structure pairs based on the plurality of tree structures, wherein each tree structure pair includes a first tree structure and a second tree structure; generating a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure; comparing between graph data structures among the plurality of graph data structures, wherein a first graph data structure representing the first tree structure of each tree structure pair is compared to a second graph data structure representing the second tree structure of the tree structure pair; and matching between tree structures of the plurality of tree structures based on the comparison.

Certain embodiments disclosed herein also include a system for root cause analysis. The system comprises: a processing circuitry; and a memory, the memory containing instructions that, when executed by the processing circuitry, configure the system to: define a plurality of tree structures based on metadata of a plurality of interconnected systems, wherein each tree structure represents at least a portion of one of the plurality of interconnected systems, wherein each tree structure includes a plurality of subtrees; identify a plurality of tree structure pairs based on the plurality of tree structures, wherein each tree structure pair includes a first tree structure and a second tree structure; generate a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure; compare between graph data structures among the plurality of graph data structures, wherein a first graph data structure representing the first tree structure of each tree structure pair is compared to a second graph data structure representing the second tree structure of the tree structure pair; and match between tree structures of the plurality of tree structures based on the comparison.

Certain embodiments disclosed herein include a method, non-transitory computer-readable medium, or system as noted above or below, further including or being configured to perform the following step or steps: generating an embedding for each of the plurality of graph data structures, wherein comparing between pairs of graph data structures of the plurality of graph data structures further comprises comparing the embeddings of the graph data structures in order to determine a maximum common embedding between each pair of compared graph data structures, wherein the matching is performed based on the determined maximum common embeddings.

Certain embodiments disclosed herein include a method, non-transitory computer-readable medium, or system as noted above or below, further including or being configured to perform the following step or steps: generating a plurality of reduced tree structures based on the plurality of tree structures, wherein each reduced tree structure corresponds to one of the plurality of tree structures, wherein each reduced tree structure is a subset of the corresponding tree structure, wherein generating the plurality of graph data structures further comprises transforming the plurality of reduced tree structures into the plurality of graph data structures.

Certain embodiments disclosed herein include a method, non-transitory computer-readable medium, or system as noted above or below, further including or being configured to perform the following step or steps: identifying a plurality subtrees among the plurality of tree structures for subsequent processing, wherein the plurality of reduced tree structures only include the identified plurality of subtrees for subsequent processing.

Certain embodiments disclosed herein include a method, non-transitory computer-readable medium, or system as noted above or below, wherein the identified plurality of subtrees includes at least one of: subtrees among suffixes of the plurality of tree structures, and subtrees including predetermined portions of text.

Certain embodiments disclosed herein include a method, non-transitory computer-readable medium, or system as noted above or below, further including or being configured to perform the following step or steps: filtering a plurality of potential tree structure pairs based on the metadata of the plurality of interconnected systems in order to create a plurality of filtered tree structure pairs, wherein the identified plurality of tree structure pairs is the plurality of filtered tree structure pairs.

Certain embodiments disclosed herein include a method, non-transitory computer-readable medium, or system as noted above or below, further including or being configured to perform the following step or steps: comparing between the metadata of the interconnected systems of the plurality of potential tree structure pairs in order to determine a plurality of intersection values for the plurality of potential tree structure pairs, wherein the plurality of potential tree structure pairs is filtered based on the plurality of intersection values.

Certain embodiments disclosed herein include a method, non-transitory computer-readable medium, or system as noted above or below, wherein one of the plurality of tree structures is indicated in cybersecurity data, further including or being configured to perform the following step or steps: identifying a root cause of a cyber threat of the cybersecurity data based on the matching.

Certain embodiments disclosed herein include a method, non-transitory computer-readable medium, or system as noted above or below, further including or being configured to perform the following step or steps: performing at least one mitigation action with respect to the identified root cause.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
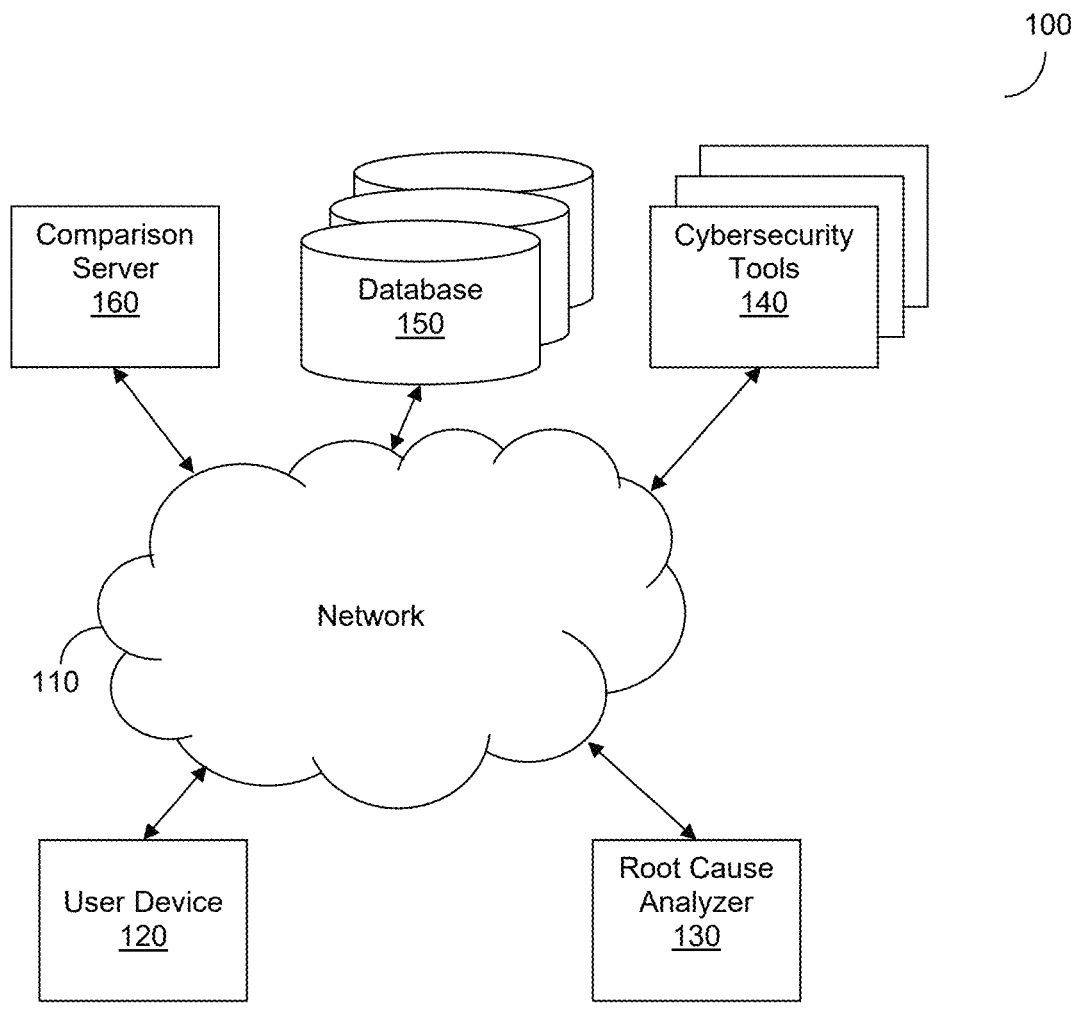
FIG. 1 is a network diagram utilized to describe various disclosed embodiments.

The various disclosed embodiments include methods and systems for tree structure analysis and techniques for using results of tree structure analysis for purposes such as root cause analysis of cybersecurity events. Various disclosed embodiments leverage techniques for comparing tree structures in order to match tree structures such as directory trees to code which may be represented as or include tree structures. When such code is source code indicated in an alert, findings data, or other cybersecurity data, matching a tree structure of a directory tree to the source code indicated in the alert as described herein may allow for identifying a location within a directory (e.g., a location of a file in a file directory) that is being or was targeted by a malicious actor as part of a cyber-attack or otherwise pursuant to a cyber threat.

In an embodiment, tree structure representations are defined for paths represented among code or other data. The tree structure representations of the paths are compared to tree structures of a directory tree or other system in order to determine one or more matching tree structures for one or more portions of code or other data, for example by comparing embeddings created based on respective tree structures. More specifically, in a further embodiment, the tree structure representations are transformed into graph structure representations, and the resulting graph structure representations are embedded and compared in order to determine which underlying tree structures match. The matching tree structures may be utilized to identify a location of a root cause or other location which is relevant to the code or other data.

In some embodiments, a similarity score may be determined between each pair of compared tree structures, for example, based on a node-by-node comparison of the graph data structures representing the tree structures. To this end, in an embodiment, the tree structures are transformed into respective graph data structures, for example by creating nodes of a graph representing subtrees of a tree data structure and connecting the nodes via edges based on an organization of the tree data structure. Transforming the tree structures into graph data structures may further include normalizing at least some of the representations using a set of graph data structure normalization rules. Using such rules may effectively allow for replacing more specific or otherwise non-normalized versions of nodes representing subtrees with normalized nodes representing their respective subtrees in a more general or otherwise normalized manner.

Based on the similarity scores, matching tree structures may be identified, or a set of results organized by degree of matching may be determined. The matching tree structure results may be utilized in order to identify a tree structure corresponding to each compared portion of code. The identified tree structure, in turn, may be utilized to, for example, determine a root cause of a cybersecurity event or otherwise a root cause of a cyber threat. Based on such a root cause, mitigation actions may be performed in order to mitigate a cyber threat.

Various disclosed embodiments may be utilized in order to determine root causes and, in particular, specific locations of root causes of issues represented in code or otherwise specific locations such as locations in a file directory which are represented in portions of code. Moreover, various disclosed embodiments may allow for such identification of root causes or other identifications of locations without requiring contents of files or other components of a directory or system (e.g., a file system). That is, various disclosed embodiments may be realized via tree structure using metadata of trees (e.g., filenames among such metadata) and without using contents of the underlying data represented by the trees (e.g., contents of files represented in a directory tree).

In this regard, it is noted that comparing contents of files or other underlying data is more resource-intensive than comparing metadata such that processes which allow for matching without comparing the underlying data can reduce use of computing resources such as, but not limited to, processing power and memory, in addition to allowing for faster comparisons. Such faster comparisons, moreover, may be particularly relevant when mitigating active cyber threats since such mitigation is a time-sensitive process. Accordingly, at least some disclosed embodiments may be utilized to more efficiently perform root cause analysis than solutions which utilize underlying file contents or other underlying data.

Additionally, it has also been identified that the underlying data may not always be accessible, for example, when the root cause analysis is performed by an entity which does not own or otherwise operate the computing environment in which the tree structures are stored and when that entity is not granted permission to access underlying data. In such situations, the metadata may be accessible such that processes which allow for matching without comparing the underlying data may enable such matching even in situations where the system performing tree structure comparisons or otherwise performing root cause analysis lacks access to the underlying data. Accordingly, various disclosed embodiments may be utilized in at least some implementations in order to allow for performing root cause analysis without necessarily comparing underlying file contents or other contents of underlying data.

Various disclosed embodiments further include techniques for preprocessing tree structure data in order to improve efficiency of tree structure comparisons. Such preprocessing steps may include, but are not limited to, cleaning a set of tree structures to be analyzed, filtering pairs for comparison, both, and the like.

The cleaning process may include analyzing tree structures with cleaning criteria defined with respect to aspects of tree structure metadata such as, but not limited to, suffixes, predetermined portions of interest, both, and the like. The cleaning process may be utilized to sample or otherwise select a subset of tree structures for analysis which are relevant to a given implementation, and may therefore be utilized to avoid processing tree structures which are unlikely to yield relevant results. This allows for further reducing the computing resources needed to compare portions metadata between tree structures.

The pair filtering may be utilized to reduce a number of candidate pairs of tree structures to be compared, thereby reducing the number of comparisons between tree structures to be performed. In an embodiment, filtering the pairs includes calculating a size of an intersection between names of tree structures of each candidate pair of tree structure. If the intersection between the names of tree structures for a given candidate pair is above a threshold, metadata of the tree structures may be compared during subsequent processing; otherwise (i.e., if the intersection between names for a given candidate pair is below a threshold), the candidate pair may be filtered out from among the set of pairs to be compared.

It should be noted that various disclosed embodiments are described with respect to directory trees, but that the disclosed embodiments may be equally applicable to implementations involving comparing other data which may be represented via tree structures. For example, at least some embodiments may be utilized to compare a neural network having weights which are represented using paths of a tree structure representing the neural network. As a non-limiting example, for implementations involving identifying the source of a classification or other machine learning result, code indicating weights of a neural network or other machine learning model used to generate the machine learning result may be compared to tree structure representations of known machine learning models in order to determine a matching machine learning model for a given portion of code.

Likewise, names or other identifiers which utilize a tree structure may be compared in accordance with various disclosed embodiments in order to identify matching names. Such matching may be used, for example, in order to compare names in a more nuanced manner than simply comparing the text of the names for character matches (e.g., identifying names as matching when all of their characters match or otherwise when characters of different names match above a threshold). In this regard, it has been identified that structures of file names or other data identifiers convey some information about the name or a role the name plays in another system on top of the actual characters within the name itself. Accordingly, using various disclosed embodiments to identify name matches may allow for more accurately matching names as compared to solutions which do not compare structures of names.

FIG. 1 shows an example network diagram 100 utilized to describe the various disclosed embodiments. In the example network diagram 100, a user device 120, a system 130, and a plurality of databases 150 (hereinafter referred to individually as a database 150 and collectively as databases 150, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 120 may be, but is not limited to, a personal computer, a laptop, a tablet computer, a smartphone, a wearable computing device, or any other device capable of receiving and displaying notifications. The user device 120 may be owned, operated, or otherwise used by a software developer or information technology (IT) agent responsible for securing one or more computing environments (not shown). Root cause analysis results determined as discussed herein may be sent to the user device 120 and used to manage potential cyber threats or otherwise manage posture within such a computing environment. In accordance with various disclosed embodiments, the user device 120 may receive notifications indicating root causes determined as discussed herein.

The root cause analyzer 130 is configured to determine potential root causes of issues. More specifically, the root cause analyzer is configured to analyze data which can be represented via tree structures such as, but not limited to, directories (e.g., file directories), machine learning architectures (e.g., by representing weights of a neural network via a tree structure), and the like.

In at least some embodiments, the issues may be potential cyber threats indicated in cybersecurity data (e.g., alerts). To this end, the root cause analyzer 130 may be configured to receive such cybersecurity data from one or more of the cybersecurity tools 140.

The cybersecurity tools 140 may be configured to monitor activity within a computing environment (not shown) in order to detect cybersecurity events or otherwise to detect potential cyber threats and to report on such monitoring (e.g., to the user device 120, to the root cause analyzer 130, etc.). In accordance with various disclosed embodiments, such reporting may include alerts or other data indicating directories or other identifiers of systems, networks, environments, architectures which may be affected by a given cyber threat.

As a non-limiting example, an alert may indicate a file among a file directory which demonstrated anomalous behavior or otherwise appears to be affected by potentially malicious activity. As discussed herein, the file directory as represented in the alert may be matched to a known file directory based on tree shape comparison in order to identify the file directory and the specific file represented in the alert, thereby allowing for determining a root cause of the potential cyber threat (e.g., the file represented in the alert or a file linked to the file represented in the alert.

The databases 150 may store data representing known directories or other data capable of being represented by tree structures. As a non-limiting example, the databases 150 may store file directories known to be included in one or more computing environments (not shown). As discussed herein, the root cause analyzer 130 is configured to match tree structures, for example by comparing between structures represented in one or more of the databases 150 and a tree structure represented in an alert from one of the cybersecurity tools 140, or by comparing between tree structures represented among the databases 150.

The comparison server 160 may be configured to compare between data structures in order to return results indicating a degree of similarity between the compared data structures. In at least some implementations, the comparison server 160 is configured to compare graph data structures, for example, by comparing such graph data structures node-by-node. The techniques for processing tree structures described herein may be utilized in order to improve the accuracy and efficiency of such processing by the comparison server, thereby allowing for identifying root causes more accurately and using fewer computing and networking resources.

It should be noted that FIG. 1 depicts an implementation of various disclosed embodiments, but that at least some disclosed embodiments are not necessarily limited as such.

Other deployments, arrangements, combinations, and the like, may be equally utilized without departing from the scope of the disclosure. For example, the comparison server 160 is depicted as a separate system from the root cause analyzer 130 as an example, but in at least some implementations, the root cause analyzer 130 may include code for performing the functions of the comparison server 160 (e.g., comparing between graph data structures).

In particular, it should be noted that the tools 140 are discussed as being cybersecurity tools for example purposes, but that at least some embodiments may use alerts or other data indicating non-cybersecurity issues (e.g., an issue in a given computing architecture such as, but not limited to, a neural network architecture). Accordingly, the root causes identified as discussed herein may, in accordance with at least some disclosed embodiments, be root causes of such issues in computing architectures. As a non-limiting example, a potentially incorrect weight of a neural network architecture may be identified in an alert, and the root cause analyzer 130 may identify a matching neural network architecture in order to determine which node of the neural network architecture has the potentially incorrect weight. As another non-limiting example, a subcomponent represented in a name of a software or other computing component may be identified as exhibiting an error in an alert, and the root cause analyzer 130 may identify a matching component name in order to determine which subcomponent of that component corresponds to the subcomponent exhibiting an error indicated in the alert.

Figure 2:
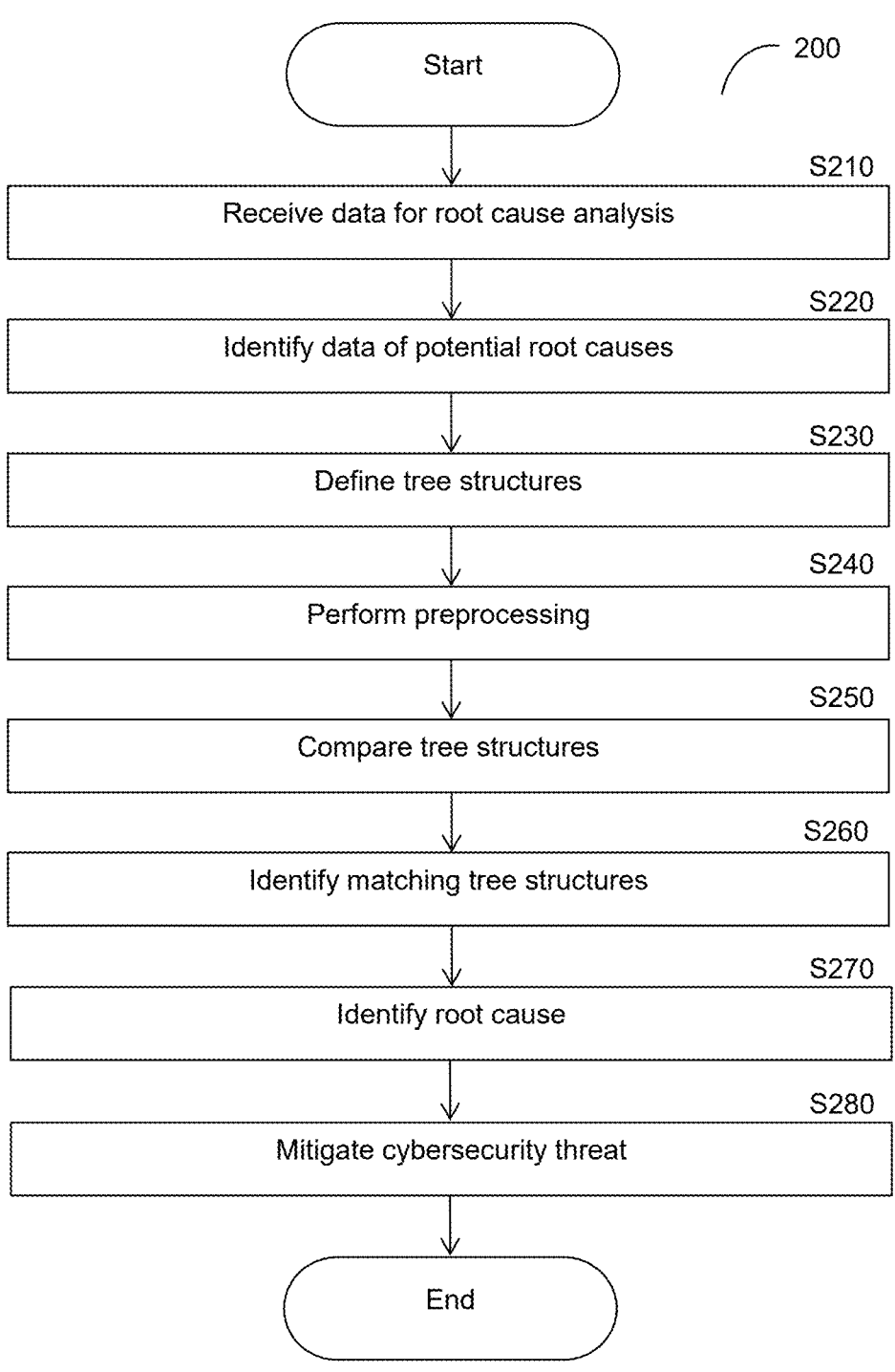
FIG. 2 is a flowchart illustrating a method for root cause analysis according to an embodiment.

FIG. 2 is a flowchart 200 illustrating a method for root cause analysis according to an embodiment. In an embodiment, the method is performed by the root cause analyzer 130, FIG. 1.

At S210, data for root cause analysis. The data for root cause analysis includes data in a tree structure or data which may otherwise be represented via tree structure (e.g., as determined based on a format or structure of at least a portion of the data. To this end, the data for root cause analysis may include the tree structure, or may include a reference to such a tree structure (e.g., a reference to a location in storage where the tree structure may be accessed).

In an embodiment, the tree structure is or may be created based on metadata. That is, the tree structure may be defined using metadata of an interconnected system (e.g., a file system, component, network, or architecture), rather than based on the underlying contents of such an interconnected system. As discussed herein, by comparing tree structures defined with respect to metadata rather than the underlying contents of these interconnected systems, computing resources may be preserved during the root cause analysis.

In this regard, it is noted that metadata for a given interconnected system has a lower amount of data than the total amount of data of that interconnected system. Accordingly, comparing tree structures defined using metadata rather than using the underlying contents allows for reducing the amount of data to be compared. It has further been identified that the shapes of tree structures representing such interconnected systems may be utilized in order to more accurately determine whether the tree structures likely represent the same interconnected system, for example, as compared to directly comparing the metadata itself and matching based on a proportion of the amount of metadata which matches.

Moreover, in some implementations, metadata of a given interconnected system may be available (e.g., to third party service providers which provide the root cause analysis, for example, in a software-as-a-service model) while the underlying contents of the interconnected system are not available or not accessible. Accordingly, comparing metadata rather than such underlying contents may enable matching in situations where the underlying content is not available for use in root cause analysis.

In an embodiment, the data received at S210 is or includes alerts or other cybersecurity data indicating potential targets or subjects of cyber threats. As a non-limiting example, the cybersecurity data may be an alert indicating a file within a file directory that exhibited anomalous behavior or otherwise was represented in anomalous traffic. To this end, in such an example, the alert may indicate both the specific file which is the subject of the cyber threat as well as the file directory which includes that file. The file directory may be represented in the alert as, for example, a reference to a location in storage of the directory or metadata representing the directory.

At S220, data representing potential root causes is identified. The data may include metadata of a system which can be represented via a tree structure or a reference to a location in storage of such metadata. Tree structures defined with respect to such metadata may be compared to tree structures defined with respect to metadata of the data received at S210 in order to, for example, determine matching scores as discussed further below.

In some embodiments, the data identified at S220 is source code of a software development infrastructure. Such source code may include subdirectories which may be represented as tree structures such that shapes of the subdirectories can be matched to shapes of file directories references in alerts or other data identified at S210 in order to determine which subdirectories represented in the source code match the file directory of a file represented in the alert or other data.

In this regard, it is noted that some aspects of software such as, but not limited to, serverless functions, may be deployed in a computing environment by compressing files of the serverless functions into compressed file formats (e.g., ZIP file formats). These serverless functions may therefore correspond to code deployed in a computing environment (e.g., source code) but may be represented in a manner that does not allow for identifying corresponding serverless functions via direct comparison of the underlying contents. The disclosed embodiments utilize metadata which can be represented via tree structures and comparisons between such tree structures in order to overcome these differences in representation while accurately identifying correlations between different representations of certain tree data structures, for example as represented in source code versus as represented in compressed files or otherwise as represented by directories.

At S230, potential tree structures for comparison are defined. In an embodiment, the defined tree structures include a set of one or more first tree structures and a set of one or more second tree structures. The first tree structures may be or may include tree structures of interconnected systems represented in the data representing potential root causes. The second tree structures may be or may include tree structures of known interconnected systems (e.g., systems existing or deployed in a particular computing environment or architecture).

In an embodiment, the tree structures are defined based on metadata of interconnected systems such that the tree structures correspond to respective interconnected systems and represent at least a portion of the interconnected systems. As a non-limiting example, when metadata of a file in an interconnected system in the form of a directory includes a file name of the file (which includes various substrings representing a path to the file within the directory), the tree structure may be defined as the file name representing such a path.

In some embodiments, the potential tree structures for comparison at least include a set of first tree structures represented in alerts (e.g., cybersecurity alerts) or other data indicating particular interconnected systems and a set of second tree structures representing known or otherwise potential candidate tree structures which might match one or more of the set of first tree structures corresponding to interconnected systems.

As a non-limiting example, the potential tree structures for comparison may include a first tree structure of a file indicated in a cybersecurity alert and multiple second tree structures of files among files in file directories of a computing environment which might match the file indicated in the cybersecurity alert such that, when one of the second tree structures is determined to match the first tree structure, the file corresponding to that matching second tree structure may be determined as the file indicated in the cybersecurity alert.

At optional S240, one or more initial preprocessing actions are performed in order to preprocess at least some of the potential tree structures before comparing the tree structures. The preprocessing may include, but is not limited to, reducing at least some of the tree structures into reduced tree structures (e.g., reduced tree structures which include subsets of their respective tree structures), cleaning the tree structures, filtering tree structure pairs to be compared (e.g., to determine certain pairs of tree structures to avoid comparing, for example, pairs of tree structures which are unlikely to yield a match), combinations thereof, and the like. An example process for preprocessing which includes steps that may be performed at S240 is described further below with respect to FIG. 3.

At S250, tree structures are compared. In an embodiment, for each pair of tree structures being compared, a matching score may be determined. The matching score determined for each compared pair of tree structures represents a degree to which a first tree structure of the pair matches a second tree structure of the pair.

In an embodiment, comparing the tree structures includes transforming the tree structures among pairs of tree structures to be compared into graph data structures and comparing the resulting graph data structures. In a further embodiment, each graph data structure includes multiple nodes, and comparing the tree structures includes comparing their corresponding graph data structures node-by-node. In such embodiments, the matching score may be determined based on a number or proportion of matching nodes (e.g., a proportion defined as a number of nodes which match between the graph data structures divided by a total number of pairs of nodes compared between the graph data structures), or may be determined as an aggregated matching score (e.g., each pair of compared nodes may be compared in order to determine a matching score for that pair of nodes, and matching scores for different pairs of nodes which were compared may be aggregated by adding the individual pair matching scores or by adding weighted versions of the individual pair matching scores).

In an embodiment, the tree structures are transformed into the graph data structures using normalized versions of respective portions of those tree structures (e.g., normalized versions of one or more subtrees in a given tree structure). That is, one or more of the nodes of a given graph data structure may be a normalized node which represents a generalized or otherwise normalized version of the corresponding portion of the tree structure. Transforming the tree structures using normalized versions may include, but is not limited to, applying normalization rules to identify portions of tree structures to be normalized and to determine the normalized versions of those portions. The normalized versions of tree portions may be, for example, but not limited to, predetermined versions corresponding to respective formats of tree structure portions as defined in the normalization rules.

As a non-limiting example for normalizing a portion of a tree structure, a subtree of the tree structure may include a portion of a file name "John.java" which is a Java class file created by or otherwise named after a particular user. The normalization rules may define a normalized version of a suffix for any class file as simply "[name].class." The result is that when a node representing a portion of a first tree structure "john.java" is compared to a node representing a portion of a second tree structure "john.class", the nodes may represent both of the subtrees "john.java" and "john-.class" as "john.class" such that a comparison between these nodes yields a 100% match.

As another non-limiting example for normalizing a portion of a tree structure, a subtree of the tree structure may include a portion of a file name "John's python.file" which is a Python file created by or otherwise named after a particular user. Because user names may vary in different representations, the normalization rules may define a normalized version of any Python file as simply "python.file." The result is that, when a node representing a portion of a first tree structure "John's python.file" is compared to a node representing a portion of a second tree structure "user123456 python.file" (where "user123456" is John), the normalized versions of those nodes may represent both of the subtrees "John's python.file" and "user123456 python.file" as "python.file" such that a comparison between these nodes yields a 100% match.

An example process for comparing tree structures which may be utilized at S250 is described further below with respect to FIG. 6.

At S260, matching tree structures are identified based on the comparisons. In an embodiment, S260 includes determining a matching score for each pair of tree structures which is compared and identifying the matching tree structures based on the matching scores.

In some embodiments, multiple potential matching tree structures may be identified for a given tree structure, for example, multiple potential matching tree structures whose comparison with the given tree structure yielded the highest matching scores among tree structures which were compared to the given tree structure. As discussed herein, such multiple potential matching tree structures may be represented as a list organized by degree of similarity (e.g., from highest matching score to lowest matching score). Such multiple potential matching tree structures may be useful, for example, in order to further improve remediation based on the comparison results. As a first example, results of matching as described herein may be combined with other root cause analysis techniques in order to more accurately identify root causes of issues.

As a second example of using lists of potential matching tree structures, the lists of potential matching tree structures may be utilized in order to filter the number of pairs of tree structures whose underlying contents are to be compared in order to conserve computing resources. That is, in some embodiments, the underlying contents of a tree structure (e.g., the contents of a file) may be compared to the underlying contents of another tree structure, and the pairs of tree structures whose contents are to be compared may be filtered using the comparison results as discussed herein in order to reduce the number of tree structures whose underlying contents are to be compared. As discussed in accordance with various disclosed embodiments, the metadata used to realize the tree structures as described herein has a lower total amount of data as compared to the underlying contents of the interconnected systems those tree systems represent. Accordingly, comparing tree structures as discussed herein in order to determine which interconnected systems for which contents to be compared may allow for conserving computing resources as compared to processes which compare underlying contents between all pairs of tree structures.

At S270, a root cause is identified based on the matching tree structure. The root cause may be, but is not limited to, a file or other component represented by a subtree of the matching tree structure. When the tree structure is transformed into a graph data structure, the root cause may be determined to be a component represented by a given node in the graph data structure.

At S280, a cybersecurity threat is mitigated based on the identified root cause. Mitigating the cybersecurity threat may include, but is not limited to, blocking traffic to one or more computing components, reconfiguring one or more software components, rebuilding one or more software components (e.g., software containers or virtual machines), sending a notification indicating the cybersecurity threat and the root cause, combinations thereof, portions thereof, and the like. To this end, in an embodiment, mitigating the cybersecurity threat further includes determining, based on the identified root cause, which remediation steps to apply, where to apply remediation steps (e.g., to certain software components, computing environments, networks, etc.), or both.

Figure 3:
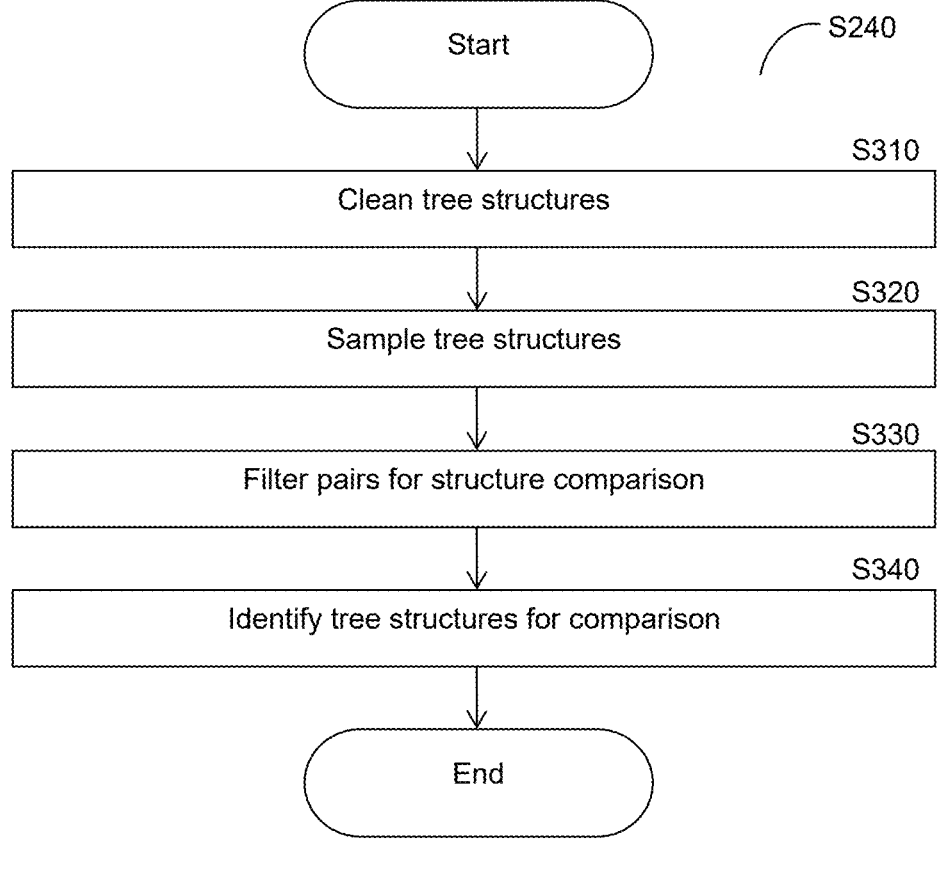
FIG. 3 is a flowchart illustrating a method for preprocessing according to an embodiment.

FIG. 3 is a flowchart S240 illustrating a method for preprocessing according to an embodiment.

At S310, at least some of the tree structures may be cleaned in order to generate reduced or otherwise cleaned tree structures. In an embodiment, cleaning the tree structures includes applying tree structure reduction rules in order to determine a subset of each tree structure for reduction. That is, in an embodiment, each tree structure to be cleaned is reduced by determining one or more subsets of the tree structure to be used in subsequent processing, where the determined subsets of a given tree structure may be identified as the reduced tree structure to be used in place of the tree structure during subsequent processing. Portions of the tree structure which are not part of any The tree structure reduction rules may be defined with respect to cleaning criteria such as, but not limited to, suffix, file type, certain predetermined portions (e.g., portions having predetermined text), combinations thereof, and the like. As a non-limiting example of a predetermined portion to be included in a reduced tree structure, a portion of a file name "/.github/workflows/" may be defined as a predetermined portion of a tree structure to be included in reduced tree structures such that the reduced tree structures for any tree structures including "/.github/workflows/" will at least include "/.github/workflows/".

Reducing the tree structures using such tree structure reduction rules may allow for reducing the amount of metadata of the tree structures to be compared as described herein. That is, the tree structure reduction rules may effectively be utilized to define portions of tree structures which are of interest for comparison purposes, for example, portions of tree structures which are known to be particularly relevant for tree shape comparisons (e.g., portions of tree structures which are closer to leaves of the trees than the base of the tree, or otherwise portions which define parts of tree structure shape which are more likely to be distinct). Accordingly, reducing the tree structures to only portions of interest may allow for reducing the amount of metadata to be compared between tree structures, the amount of subtrees to be transformed into nodes of graph data structures, both, and the like. This, in turn, allows for conserving computing resources.

An example process for tree structure cleaning which may be utilized at S310 is discussed further below with respect to FIG. 4.

At S320, a set of tree structures is identified for subsequent processing. More specifically, in an embodiment, tree structures may be sampled from among the tree structures after at least some of the tree structures have been cleaned, and the sampled tree structures may be identified as the set of tree structures for subsequent processing. In another embodiment, the tree structures including the cleaned tree structures may be identified for subsequent processing.

At S330, potential pairs of tree structures to be compared are filtered in order to result in a filtered set of tree structure pairs. Each filtered set of tree structure pairs may include a first tree structure and a second tree structure to be compared to each other as described herein. In some implementations, the potential pairs of tree structures initially include each potential combination of different tree structures between a first set of tree structures (e.g., a tree structure represented in an alert) and a second set of tree structures (e.g., a set of known tree structures to be compared to the tree structure represented in the alert).

In an embodiment, filtering the potential pairs of tree structures includes comparing tree structure metadata between tree structures of each pair and determining intersection values. Based on the intersection values, pairs of tree structures may be filtered out and avoided during subsequent processing. For example, pairs of tree structures having intersection values below a threshold may be filtered out because those pairs of tree structures are unlikely to yield matches, thereby conserving computing resources.

An example process for tree structure pair filtering which may be utilized at S330 is described further below with respect to FIG. 5.

At S340, tree structures to be compared are identified. In an embodiment, the tree structures to be compared including the resulting tree structures after preprocessing at any or all of S310 through S330.

It should be noted that the steps S310 through S330 are depicted as part of the same preprocessing flow for example purposes, but that at least some disclosed embodiments are not limited to the set of preprocessing actions depicted in FIG. 3. Additional preprocessing steps may be used, some of the preprocessing steps shown in FIG. 3 may be excluded, or both, without departing from the scope of at least some disclosed embodiments. Further, in at least some embodiments, the preprocessing steps may be performed in a different order than the order shown in FIG. 3.

Figure 4:
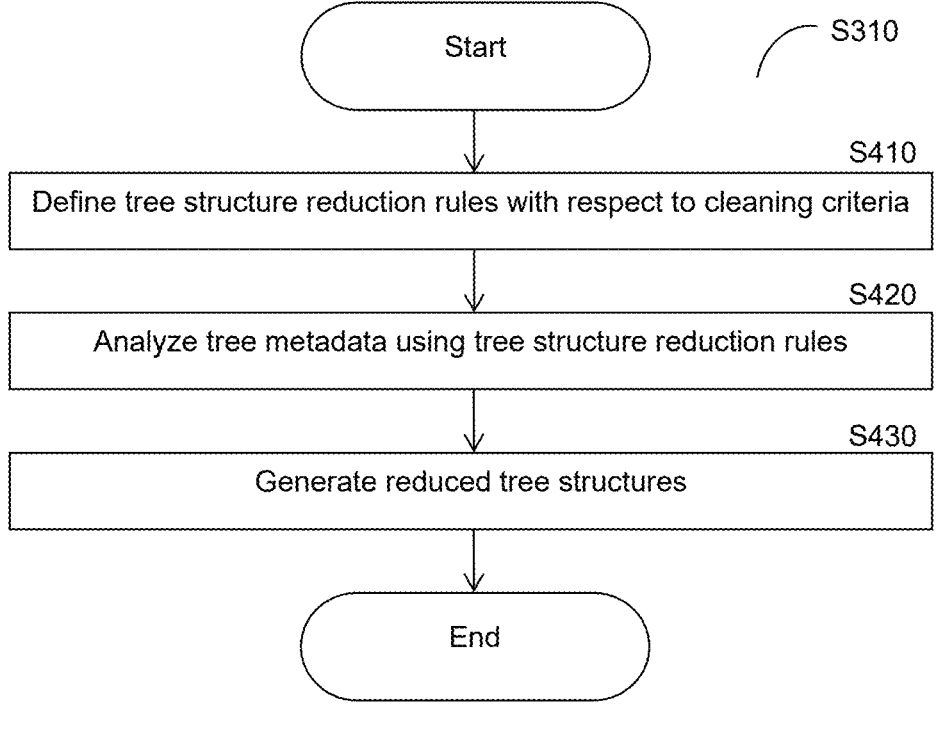
FIG. 4 is a flowchart illustrating a method for tree structure cleaning according to an embodiment.

FIG. 4 is a flowchart S310 illustrating a method for tree structure cleaning according to an embodiment.

At S410, tree structure reduction rules to be used for cleaning are defined with respect to one or more cleaning criteria. The cleaning criteria may be predetermined, determined based on user inputs, or a combination thereof.

The cleaning criteria may define, for example, portions of tree structures which should be included for comparison purposes (e.g., for comparisons between shapes of tree structures as discussed herein), portions of tree structures to be excluded for comparison purposes, both, and the like. The cleaning criteria may be used to determine which portions of tree structures to remove during cleaning in order to produce sets of reduced tree structures. More specifically, the cleaning criteria may be defined in order to optimize comparisons. To this end, the cleaning criteria may define portions of tree structures which have a high degree of relevance to tree structure shape such that comparing only these portions allows for conserving computing resources related to processing the comparisons while maintaining accuracy. That is, the cleaning criteria may effectively define which portions of the tree structure can be removed in order to reduce processing without negatively affecting comparison accuracy (or without reducing comparison accuracy more than a threshold amount).

The cleaning criteria may define portions of the tree structures to be kept for subsequent comparisons between tree structures. Such portions to be kept for comparison purposes may include, but are not limited to, suffix, portion of interest, both, and the like.

For suffixes, the cleaning criteria may define which portions of a given tree structure are considered to be the suffix (e.g., a portion of the tree structure including the end of a branch of the tree. To this end, the cleaning criteria may further define how to identify such portions, for example, by defining subtrees with respect to separator characters (e.g., slashes such as "/" or "\" such that a subtree lies between two slashes) and defining a number of subtrees which make up a suffix (e.g., 3 subtrees such that the last three portions of the tree structure as defined using the slashes make up the suffix and are kept for comparison purposes).

For portions of interest, the portions of interest may be defined with respect to predetermined portions of text (e.g., "/.github/workflows/") such that any subtrees including the predetermined portions of text are identified as portions of interest to be kept for comparison purposes.

At S420, tree structure metadata is analyzed with respect to the cleaning criteria using the tree structure reduction rules. In an embodiment, the tree structure metadata is analyzed to identify one or more subtrees of each tree structure to be used for subsequent processing, for example, suffixes or portions of interest to be kept for comparison purposes as discussed above.

At S430, one or more reduced tree structures are generated based on the analysis. Each reduced tree structure is a subset of the corresponding pre-reduction tree structure for which portions were identified using the tree structure reduction rules. As discussed herein, the reduced tree structures may include only portions which are particularly relevant to tree structure shape comparison in order to preserve computing resources while maintaining comparison accuracy.

Figure 5:
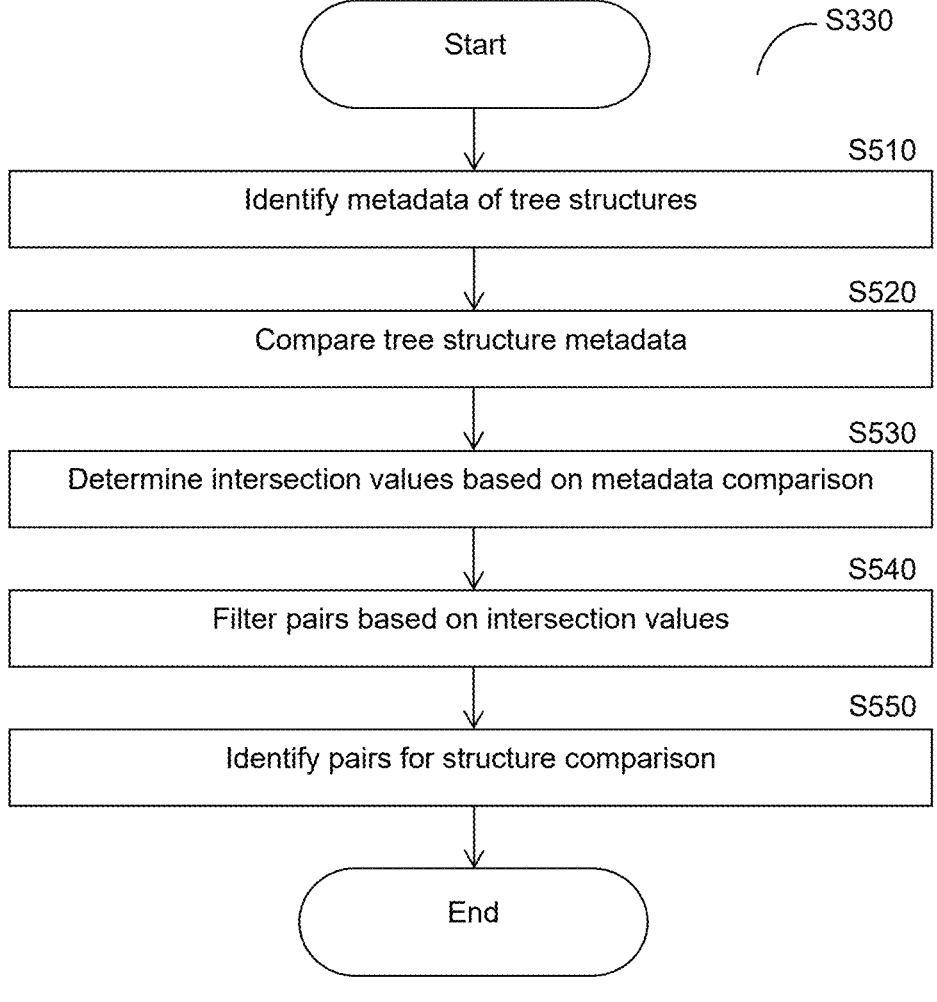
FIG. 5 is a flowchart illustrating a method for pair filtering according to an embodiment.

FIG. 5 is a flowchart S330 illustrating a method for pair filtering according to an embodiment.

At S510, metadata of tree structures is identified. More specifically, metadata of tree structures among a set of potential tree structure pairs to be compared is identified. In an embodiment, the identified metadata is or includes file names of files. Such file names may be file names including part or all of the paths of their respective files such that the file names represent the tree structures of the files.

At S520, tree structure metadata is compared for each of the potential tree structure pairs. As a non-limiting example, file names of the files represented by the tree structures among the potential tree structure pairs are compared. To this end, in an embodiment, the compared metadata is a file name for each of the interconnected systems represented by the tree structures of each potential tree structure pair. That is, a file name corresponding to a first tree structure of each potential tree structure pair is compared to a file name corresponding to a second tree structure of the potential tree structure pair.

In an embodiment, comparing the metadata of each tree structure pair includes applying one or more intersection operations between the metadata of the first tree structure of the pair and the metadata of the second tree structure of the pair. Such an intersection operation may result in an intersection value which represents a degree to which elements (e.g., substrings, characters, etc.) in one portion of metadata (e.g., a string of a file name) matches that of another portion of metadata.

In an embodiment, applying such an intersection operation between metadata of tree structures uses fewer computing resources than transforming tree structures into graph data structures, comparing between tree structures (e.g., comparing between the tree structures themselves, or comparing between transformed graph data structures representing the tree structures), or both. As a result, determining the intersection values may allow for using fewer computing resources by filtering pairs to be compared based on the relatively low computing resource process of applying intersection operations and only performing the full comparison for pairs of tree structures whose metadata matches above a threshold.

At S530, intersection values are determined based on the compared metadata. In an embodiment, the intersection values are determined based on outputs of the intersection operations. In a further embodiment, an intersection value is determined for each potential tree structure pair.

At S540, pairs of tree structures are filtered from among the potential tree structure pairs in order to create a filtered set of tree structure pairs based on the intersection values. In an embodiment, each potential tree structure pair having an intersection value below a threshold (e.g., a predetermined threshold) is filtered out from among the potential tree structure pairs such that only tree structure pairs having intersection values greater than or equal to the threshold remain among the filtered set of tree structure pairs for subsequent processing. That is, in an embodiment, only the tree structure pairs remaining after filtering are processed using the subsequent transformation and/o comparison steps discussed herein.

In this regard, it is noted that there may be a large number of potential pairs to be compared, particularly when performing an everything-to-everything comparison process. For example, a computing environment may have many files, each having its own file path represented by a respective tree structure. As a further example, a cybersecurity alert may indicate many affected files which may need to be matched to files stored in the computing environment. Comparing each and every potential pair featuring one of the files indicated in the alert and one of the files among the computing environment could require tens of thousands (or more) comparisons, which may take a long time to process relative to the amount of time in which the cyber threat is not being remediated.

In particular, various disclosed embodiments utilize transformations to transform metadata of tree structures into graph representations in order to allow for element-by-element comparison (e.g., comparing subtrees between tree structures), and this transformation may require significant computing resources when each and every potential tree structure needs to be transformed. Utilizing intersection values based on comparison of raw metadata may allow for reducing the number of tree structures to be transformed, compared with respect to tree shape, or both, thereby allowing for conserving computing resources.

At S550, tree structure pairs to be compared are identified. In an embodiment, the identified tree structure pairs to be compared is the filtered set of tree structure pairs.

Figure 6:
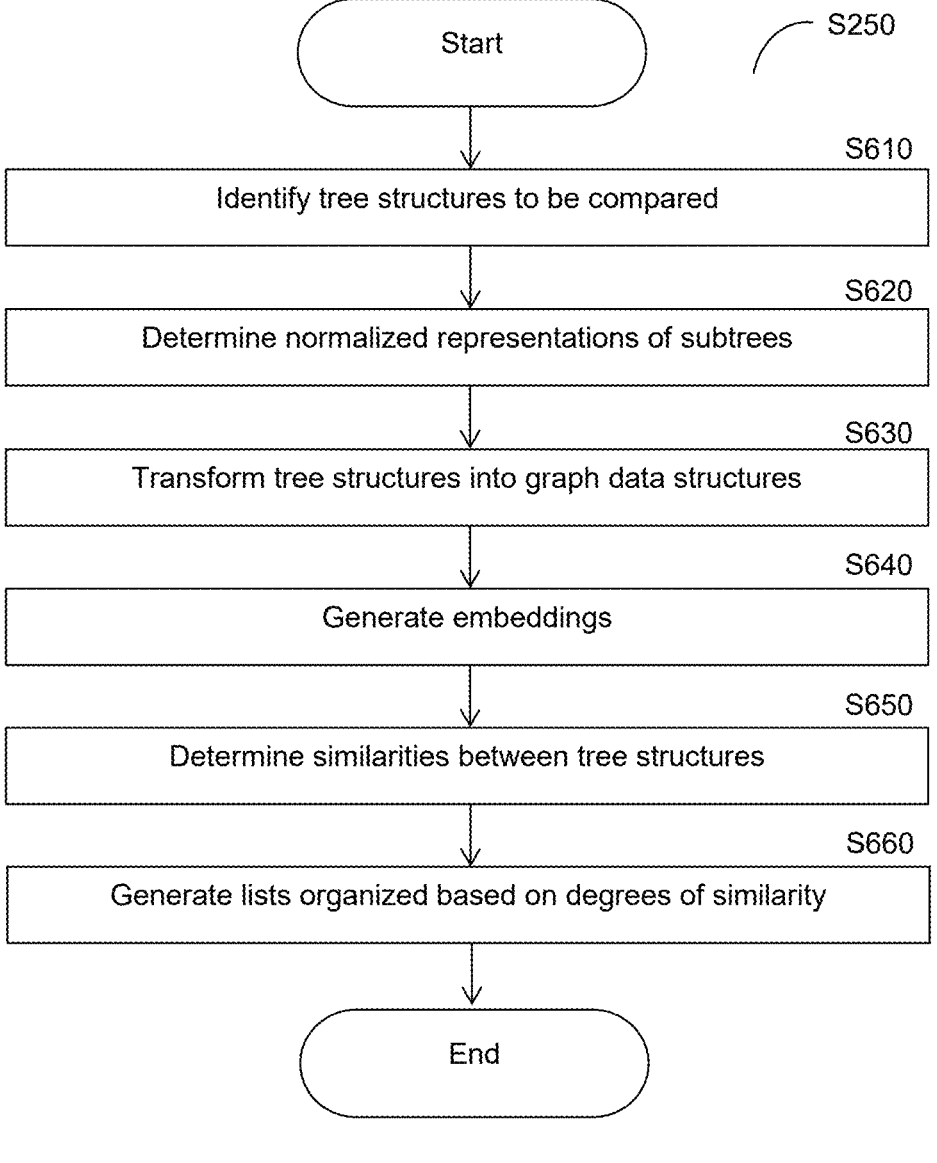
FIG. 6 is a flowchart illustrating a method for tree structure comparison according to an embodiment.

FIG. 6 is a flowchart S250 illustrating a method for tree structure comparison according to an embodiment.

At S610, tree structures to be compared are identified. In an embodiment, the tree structures to be compared are tree structures among a set of tree structure pairs. As noted above, each tree structure pair to be compared includes a first tree structure from a first set of tree structures and a second tree structure from a second set of tree structures. In an embodiment, the tree structures to be compared are tree structures among a filtered set of tree structure pairs (e.g., a filtered set of tree structure pairs created as discussed above with respect to FIG. 5).

At optional S620, normalized representations of at least some subtrees among the identified tree structures are determined. In an embodiment, S620 includes applying normalization rules with respect to subtrees of the identified tree structures. The normalization rules define normalized versions of the subtrees to be used for subsequent processing (e.g., during transformation and comparison).

The normalization rules may define generic or otherwise normalized versions of subtrees. To this end, the normalization rules may define subtrees which demonstrate certain specific aspects as well as the corresponding normalized versions of subtrees having those aspects. Such aspects to be normalized may include, but are not limited to, specific users (e.g., as identified by specific user names or user identifiers), entity-specific keywords (e.g., keywords used in file names used by a specific entity), wildcards (e.g., subtrees which may relate to defining structure but which are not classified into a specific aspect to be normalized), combinations thereof, and the like.

In an embodiment, in order to define the wildcards, the normalization rules may define such wildcards with respect to a position within its respective subtree. That is, wildcards may be defined such that they match any subtree regardless of whether their underlying substrings match, for example by defining wildcards with respect to positions rather than with respect to substrings or otherwise with respect to text. In a further embodiment, such a position may be defined with respect to a number of subtrees from a leaf of the tree (e.g., the last subtree, where each subtree is defined with respect to separator characters).

As a non-limiting example for identifying a wildcard using normalization rules, the normalization rules may define the second-to-last subtree as being a wildcard such that, for a tree structure which includes "/home/wile/project1/main.py" as the end of the tree structure, "project1" is identified as a wildcard. As a further non-limiting example, the normalization rules may define the normalized version of a wildcard as "*" such that this portion of the tree structure is represented as "/home/wile/*/main.py" for comparison purposes. Accordingly, other tree structures having similar structure but lacking "project1" as the second-to-last subtree may be matched to this tree structure.

At S630, the tree structures are transformed into graph data structures based on the identified paths. In an embodiment, transforming the tree structures includes translating subtrees of each tree structure into respective nodes of a graph data structure. Each such node represents the respective subtree.

In a further embodiment, at least some of the nodes of the graph data structures are defined using normalized representations of the subtrees as discussed above with respect to S620. That is, the node for each subtree being represented using a normalized version in a given tree structure is represented using a node representing the normalized version of the subtree rather than the original version of the subtree. Consequently, the nodes representing the normalized versions of the subtrees will match nodes representing subtrees having matching normalized versions even if their original versions do not match.

At S640, embeddings are generated based on the graph data structures. In an embodiment, S640 includes embedding the nodes of the graph data structures into an embeddings of each graph data structure. The embeddings may be compared between graph data structures in order to determine similarities between their corresponding tree structures.

At S650, similarities between tree structures (e.g., between the first and second tree structures of each pair of tree structures to be compared) are determined based on the maximum common embeddings. In an embodiment, determining similarities between tree structures includes, for each tree structure pair, determining a similarity score representing a degree of similarity between the first tree structure and the second tree structure of the pair. In a further embodiment, S650 includes determining a maximum common embedding for each tree structure pair between the embeddings generated at S640 and determining the similarity scores based on the maximum common embeddings.

In some embodiments, determining similarities between the tree structures includes sending data of the tree structures (e.g., the tree structures, the graph data structures, or both) to a system configured to compare between such data structures (e.g., the comparison server 160, FIG. 1). The system may return matching scores or other comparison results for the tree structures based on the data sent to the system.

At optional S660, one or more lists of tree structure matches is generated based on the determined similarities. The lists of tree structure matches may be or may include, but is not limited to, a list of potentially matching tree structures for each of the compared tree structures. Such lists may be organized, for example, based on similarity (e.g., from highest similarity to lowest). In some implementations, only the top ranking tree structures (e.g., as determined based on similarity score) or only tree structures having a similarity score above a threshold are included in the list for a given tree structure.

Such lists of tree structure matches may be utilized to improve remediation, for example, by prioritizing remediation actions based on the lists (e.g., prioritizing remediation actions for tree structures having matches with the highest similarity scores), by combining the results of matching as described herein with other root cause analysis techniques, both, and the like.

Additionally, in some embodiments, the lists of tree structure matches may indicate potentially matching tree structures for a given tree structure, and such lists may be utilized in order to determine which tree structures for which the underlying contents should be compared to the underlying contents of the given tree structure. This may allow for determining final matches based on comparison of the underlying contents while only comparing metadata for some of the tree structures. Moreover, when the underlying contents of tree structures must be retrieved in order to allow for comparison, only underlying contents to be used for the final matching may be retrieved, thereby conserving networking resources, memory, or both. Accordingly, this embodiment may be utilized in order to improve accuracy of matching while conserving computing resources.

For example, each list of potentially matching tree structures for a given tree structure may be iterated by comparing the underlying contents of one of the potentially matching tree structures to the underlying contents of the given tree structure in order based on matching scores (e.g., comparing the potentially matching tree structure with the highest matching score first, the potentially matching tree structure with the second-highest matching score second, and so on). The comparison between the underlying contents may include, but is not limited to, text matching, matching based on natural language (e.g., by applying natural language processing and comparing results), both, and the like.

Figure 7:
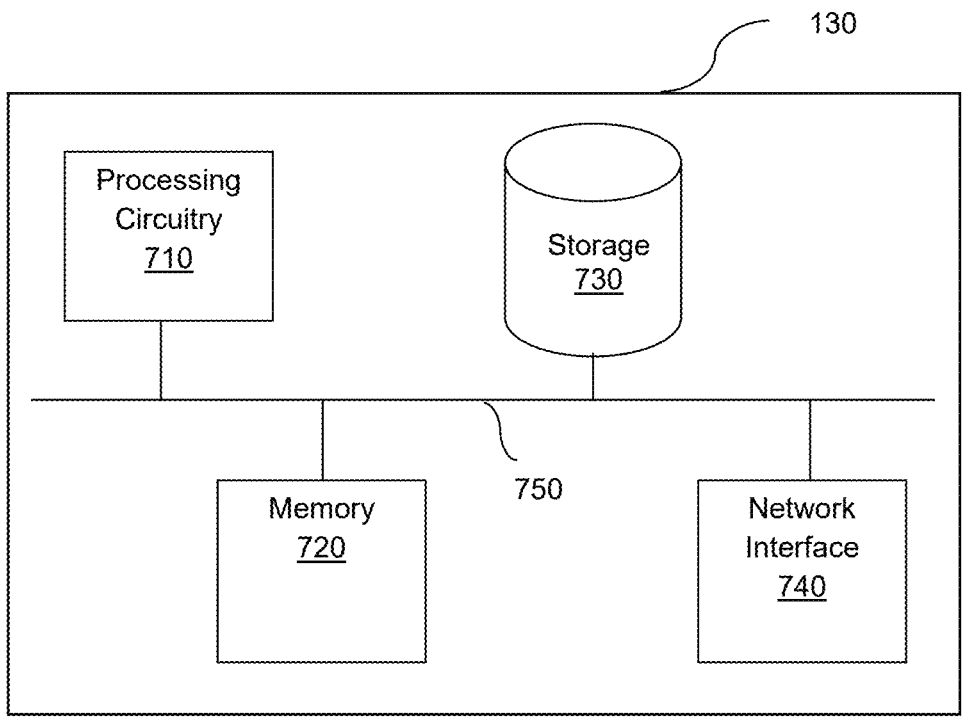
FIG. 7 is a schematic diagram of a root cause analyzer according to an embodiment.

FIG. 7 is an example schematic diagram of a root cause analyzer 130 according to an embodiment. The root cause analyzer 130 includes a processing circuitry 710 coupled to a memory 720, a storage 730, and a network interface 740. In an embodiment, the components of the root cause analyzer 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the root cause analyzer 130 to communicate with other systems, devices, components, applications, or other hardware or software components, for example as described herein.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for root cause analysis, comprising:

defining a plurality of tree structures based on metadata of a plurality of interconnected systems, wherein each tree structure represents at least a portion of one of the plurality of interconnected systems, wherein each tree structure includes a plurality of subtrees;

identifying a plurality of tree structure pairs based on the plurality of tree structures, wherein each tree structure pair includes a first tree structure and a second tree structure;

generating a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure;

comparing between graph data structures among the plurality of graph data structures, wherein a first graph data structure representing the first tree structure of each tree structure pair is compared to a second graph data structure representing the second tree structure of the tree structure pair;

matching between tree structures of the plurality of tree structures based on the comparison in order to identify a tree structure of the plurality of tree structures which matches a tree structure of a file indicated in cybersecurity data;

identifying a root cause of a cyber threat of the cybersecurity data based on the matching; and blocking traffic to one of the plurality of interconnected systems based on the identified root cause.

2. The method of claim 1, further comprising:

generating an embedding for each of the plurality of graph data structures, wherein comparing between pairs of graph data structures of the plurality of graph data structures further comprises comparing the embeddings of the graph data structures in order to determine a maximum common embedding between each pair of compared graph data structures, wherein the matching is performed based on the determined maximum common embeddings.

3. The method of claim 1, further comprising:

generating a plurality of reduced tree structures based on the plurality of tree structures, wherein each reduced tree structure corresponds to one of the plurality of tree structures, wherein each reduced tree structure is a subset of the corresponding tree structure, wherein generating the plurality of graph data structures further comprises transforming the plurality of reduced tree structures into the plurality of graph data structures.

4. The method of claim 3, wherein generating the plurality of reduced tree structures further comprises:

identifying a plurality subtrees among the plurality of tree structures for subsequent processing, wherein the plurality of reduced tree structures only include the identified plurality of subtrees for subsequent processing.

5. The method of claim 4, wherein the identified plurality of subtrees includes at least one of: subtrees among suffixes of the plurality of tree structures, and subtrees including predetermined portions of text.

6. The method of claim 1, wherein identifying the plurality of tree structure pairs further comprises:

filtering a plurality of potential tree structure pairs based on the metadata of the plurality of interconnected systems in order to create a plurality of filtered tree structure pairs, wherein the identified plurality of tree structure pairs is the plurality of filtered tree structure pairs.

7. The method of claim 6, wherein filtering the plurality of potential tree structure pairs further comprises:

comparing between the metadata of the interconnected systems of the plurality of potential tree structure pairs in order to determine a plurality of intersection values for the plurality of potential tree structure pairs, wherein the plurality of potential tree structure pairs is filtered based on the plurality of intersection values.

8. A non-transitory computer-readable medium having stored thereon instructions for causing a processing circuitry to execute a process, the process comprising:

defining a plurality of tree structures based on metadata of a plurality of interconnected systems, wherein each tree structure represents at least a portion of one of the plurality of interconnected systems, wherein each tree structure includes a plurality of subtrees;

identifying a plurality of tree structure pairs based on the plurality of tree structures, wherein each tree structure pair includes a first tree structure and a second tree structure;

generating a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure;

comparing between graph data structures among the plurality of graph data structures, wherein a first graph data structure representing the first tree structure of each tree structure pair is compared to a second graph data structure representing the second tree structure of the tree structure pair;

matching between tree structures of the plurality of tree structures based on the comparison in order to identify a tree structure of the plurality of tree structures which matches a tree structure of a file indicated in cybersecurity data;

identifying a root cause of a cyber threat of the cybersecurity data based on the matching; and blocking traffic to one of the plurality of interconnected systems based on the identified root cause.

9. A system for root cause analysis, comprising:

a processing circuitry; and a memory, the memory containing instructions that, when executed by the processing circuitry, configure the system to:

define a plurality of tree structures based on metadata of a plurality of interconnected systems, wherein each tree structure represents at least a portion of one of the plurality of interconnected systems, wherein each tree structure includes a plurality of subtrees;

identify a plurality of tree structure pairs based on the plurality of tree structures, wherein each tree structure pair includes a first tree structure and a second tree structure;

generate a plurality of graph data structures based on the plurality of tree structures, wherein each graph data structure corresponds to a tree structure of the plurality of tree structures and includes a plurality of nodes, wherein each node of each graph data structure represents a respective subtree of the plurality of subtrees of the corresponding tree structure;

compare between graph data structures among the plurality of graph data structures, wherein a first graph data structure representing the first tree structure of each tree structure pair is compared to a second graph data structure representing the second tree structure of the tree structure pair;

match between tree structures of the plurality of tree structures based on the comparison in order to identify a tree structure of the plurality of tree structures which matches a tree structure of a file indicated in cybersecurity data;

identify a root cause of a cyber threat of the cybersecurity data based on the matching; and block traffic to one of the plurality of interconnected systems based on the identified root cause.

10. The system of claim 9, wherein the system is further configured to:

generate an embedding for each of the plurality of graph data structures, wherein comparing between pairs of graph data structures of the plurality of graph data structures further comprises comparing the embeddings of the graph data structures in order to determine a maximum common embedding between each pair of compared graph data structures, wherein the matching is performed based on the determined maximum common embeddings.

11. The system of claim 9, wherein the system is further configured to:

generate a plurality of reduced tree structures based on the plurality of tree structures, wherein each reduced tree structure corresponds to one of the plurality of tree structures, wherein each reduced tree structure is a subset of the corresponding tree structure, wherein generating the plurality of graph data structures further comprises transforming the plurality of reduced tree structures into the plurality of graph data structures.

12. The system of claim 11, wherein the system is further configured to:

identify a plurality subtrees among the plurality of tree structures for subsequent processing, wherein the plurality of reduced tree structures only include the identified plurality of subtrees for subsequent processing.

13. The system of claim 12, wherein the identified plurality of subtrees includes at least one of: subtrees among suffixes of the plurality of tree structures, and subtrees including predetermined portions of text.

14. The system of claim 9, wherein the system is further configured to:

filter a plurality of potential tree structure pairs based on the metadata of the plurality of interconnected systems in order to create a plurality of filtered tree structure pairs, wherein the identified plurality of tree structure pairs is the plurality of filtered tree structure pairs.

15. The system of claim 14, wherein the system is further configured to:

compare between the metadata of the interconnected systems of the plurality of potential tree structure pairs in order to determine a plurality of intersection values for the plurality of potential tree structure pairs, wherein the plurality of potential tree structure pairs is filtered based on the plurality of intersection values.

* * * * *